United States Patent
Yamamoto et al.

[11] Patent Number: 5,899,495
[45] Date of Patent: May 4, 1999

[54] AIR BAG SYSTEM AND METHOD OF FOLDING AN AIR BAG

[75] Inventors: Naoki Yamamoto; Kazuyoshi Nishijima; Kazuhiro Kaneko; Mikio Ochiai, all of Fuji, Japan

[73] Assignee: Nihon Plast Co., Ltd., Shizuoka, Japan

[21] Appl. No.: 08/845,731

[22] Filed: Apr. 25, 1997

[51] Int. Cl.$^6$ .................................................. B60R 21/16
[52] U.S. Cl. ................................. 280/743.1; 280/743.2
[58] Field of Search ........................... 280/743.1, 743.2, 280/729

[56] References Cited

U.S. PATENT DOCUMENTS

| | | | |
|---|---|---|---|
| 4,968,057 | 11/1990 | Rafferty | 280/731 |
| 5,048,863 | 9/1991 | Henseler et al. | 280/743.1 |
| 5,405,166 | 4/1995 | Rogerson | 280/743.1 |
| 5,454,595 | 10/1995 | Olson et al. | 280/743.1 |
| 5,498,031 | 3/1996 | Kosugi | 280/743.2 |
| 5,599,040 | 2/1997 | Takahashi | 280/729 |
| 5,732,973 | 3/1998 | Turnbull et al. | 280/743.1 |

FOREIGN PATENT DOCUMENTS

| | | | |
|---|---|---|---|
| 2030863 | 12/1971 | Germany | 280/743.1 |
| 3-67748 | 3/1991 | Japan | 280/743.1 |
| 3-279053 | 12/1991 | Japan | 280/743.2 |
| 4-166453 | 6/1992 | Japan | 280/743.1 |
| 06127330 | 5/1994 | Japan . | |
| 07277129 | 10/1995 | Japan . | |
| 07329664 | 12/1995 | Japan . | |

Primary Examiner—Paul N. Dickson
Attorney, Agent, or Firm—Joseph C. Mason, Jr.; Dennis G. LaPointe

[57] ABSTRACT

An air bag system is provided that limits the forward projection of the air bag and reduces production costs wherein folded portions are formed by folding the peripheral portion of a flatly spread air bag along folding lines which are provided at specified locations. The formed folded portions are constrained by stitched portions which are formed by stitching folded-down portions with thread. The air bag is then folded into a size so as to be constrained in a cover. When gas is injected from an inflator, the air bag tears the cover and projects forward and at the same time the stitched portions limit the distance by which the air bag projects forward. As the internal pressure in the air bag increases, the stitched portions break and the folded portions are unfolded so that the air bag expands radially.

6 Claims, 11 Drawing Sheets

AIR BAG SYSTEM AND METHOD OF FOLDING AN AIR BAG

FIELD OF THE INVENTION

The present invention relates to an air bag system for protecting a passenger of a vehicle or the like from a shock resulting from a collision of same. The invention also relates to a method of folding such an air bag.

BACKGROUND OF THE INVENTION

An example of conventional air bag systems is an air bag system for protecting a driver, which is incorporated in the center pad of a boss portion of the steering wheel of a vehicle This air bag system essentially comprises a base plate fastened to the body of the steering wheel, a basically cylindrical gas generator (generally called an inflator) mounted on the base plate, a pouch-shaped air bag so folded as to cover the inflator, and a cover so attached to the base plate as to cover the air bag. With the structure as above, when the control unit of the system detects a shock which may result from a collision of the vehicle, the air bag system actuates the inflator to cause a large quantity of inert gas to be instantaneously ejected from the inflator into the air bag, thereby unfolding and inflating the air bag. The pressure of the expansion of the air bag tears the cover and projects the air bag towards the front of the driver, where the air bag continues to be unfolded and inflated at the same time to protect the driver by thus reducing the shock received by the driver.

A need exists for the air bag of an air bag system described above to be so constructed and arranged in the system as to project from the cover speedily by tearing the cover instantaneously and to be inflated into a specified shape, such as a wide, flat shape spreading in front of the driver.

An example of structures dealing with the above problems is disclosed in Japanese Patent Laid-open No. 127330/1994, which uses straps having a specified length and sewed at the two ends of each strap to the inner face of the front and the bottom fabric materials of the air bag in order to limit the height (the distance) by which the air bag projects forward, towards the person seated in front of the air bag system (hereinafter simply referred to as a passenger or the passenger) and allow the air bag to smoothly expand in the radial direction (in the direction of the circumferential edge of the air bag). However, the above structure that uses straps bridging the inner surface of the fabric materials necessitates a complicated sewing operation to sew the fabric materials as above and consequently increases production costs. As the straps receive a great load when the air bag is inflated, the straps have to be ensured to have a sufficient strength. This, too, increases production costs. Furthermore, as the straps inside the air bag increase the volume of the whole folded air bag, it is difficult to provide a compact air bag system.

Another example of air bag systems is disclosed in Japanese Patent Laid-open No. 305387/1994. An air bag disclosed therein has a stitched portion where the front fabric material and the back fabric material of the air bag are sewed together at a specified location or locations in the state that the bag is spread out in a circular state. Thereafter, tie air bag is folded up into a compact shape and disposed in a housing. According to the above structure, when gas is ejected into the air bag, the stitched portions limit the forward inflation of the air bag, thereby allowing the air bag to smoothly expand in the radial direction, towards its circumferential edge. Then, at a specified stage during the process of the inflation of the air bag, the threads of the stitched portions are torn so that the air bag expands forward, in the direction of the passenger. However, the structure that calls for folding an air bag after sewing together the front and the back fabric materials presents a problem in that it is difficult to make use of gas pressure effectively to tear the cover, because expansion of the air bag is limited until the threads are broken. Furthermore, as the air bag expands forward when the increased internal pressure in the air bag has broken the threads, it is necessary to conduct thorough research and investigations concerning various factors such as the radial dimension of the air bag, how to fold the air bag and the breaking strength of the stitching thread in order to appropriately control the distance which the air bag is projected forward so as to expand the air bag widely and evenly. This means that reduction of production costs is difficult according to the above structure.

Another example structure wherein the fabric materials of an air bag are sewed together is disclosed in Japanese Patent Laid-open No. 329664/1995, which calls for folding the peripheral edge of an air bag inward and stitching this folded portion at a stitched portion. This structure, however, has a drawback wherein reduction of production costs is difficult because not only is a complicated procedure of turning the air bag inside out necessary but it is also difficult to smooth out the stitched portions to eliminate wrinkles.

Another example is disclosed in Japanese Patent Laid-open No. 277129/1995, which calls for providing breakable ear portions around the circumferential edge of an air bag, bending these ear portions towards the bottom face of the air bag and secure them by means of bolts which fasten the air bag and the inflator. According to this structure, however the ear portions formed at the peripheral edge of the air bag are fastened to the bottom of the system. Therefore, when the air bag is inflated, the ear portions and the portions of the air bag fabric which are rolled together with the ear portions are pushed against the base plate or the inner surface of the cover, preventing the ear portions from breaking smoothly, and consequently making it difficult for the air bag to be unfolded smoothly.

As described above, the above structure that uses straps bridging the inner surface of the fabric material at two locations necessitates a complicated sewing operation to sew the fabric in such a manner and consequently increases production costs. As the straps receive a great load when the air bag is inflated, the straps have to be ensured to have a sufficient strength, which, too, increases production costs, Furthermore, as the provision of the straps inside the air bag increase the volume of the whole folded air bag, the above structure presents another problem in that it is difficult to provide a compact air bag system. The structure that calls for sewing the fabric materials at the front and the back sides of the air bag together and subsequently folding the air bag, too, has a drawback wherein making use of gas pressure effectively to tear the cover is difficult, because expansion of the air bag is limited until the thread is broken. In addition, as the air bag expands forward when the increased internal pressure in the air bag has broken the thread, it is necessary to conduct thorough research and investigations concerning various factors such as the radial dimension of the air bag, how to fold the air bag and the breaking strength of the stitching thread in order to appropriately control the distance which the air bag is projected forward so as to expand the air bag widthwise and evenly, and such criteria makes reduction of production costs difficult. Furthermore, the structure that calls for folding the peripheral edge of an air bag inward and stitching the folded portion at a stitched portion makes it difficult to reduce production costs because not only is a complicated procedure of turning the air bag inside out necessary but it is also difficult to smooth out the stitched portion to eliminate wrinkles According to the structure that calls for providing breakable eat portions at the circumferential edge of an air bag, bending these ear portions towards the bottom of the air bag and fastening them by means of bolts which secure the air bag and the inflator, the ear portions and the portions of the air bag fabric which are rolled together with the ear portions are pushed against the base plate or the inner surface of the cover when the air bag is inflated. As a result the ear portions are prevented from breaking smoothly, and it is therefore difficult for the air bag to be unfolded smoothly.

In order to solve the above problems, an object of the present invention is to provide an air bag system and a method of folding an air bag which are capable of rapidly unfolding and inflating an air bag.

SUMMARY OF THE INVENTION

An air bag system of the invention includes a pouch-shaped air bag to be unfolded and inflated by gas introduced thereinto, the air bag having folded portions formed by folding the peripheral portion of the flatly spread air bag towards the center of the air bag, and each folded portion stitched to the flat portion of the air bag at a constraint portion located within the folded portion.

According to the above structure, when gas flows into the air bag, the part surrounded by the stitched portions projects forward by a specified distance, and, when the internal pressure in the air bag reaches a specified value, the stitched portions are released and the folded portions are unfolded and inflated outward. As an air bag according to the invention can be produced simply by folding a conventional air bag at specified positions and stitching the folded portions, the production process can be simplified.

An air bag system of the invention includes a pouch-shaped air bag to be unfolded and inflated by gas introduced thereinto, a cover for containing the air bag in a folded state, and a supporting member for supporting the air bag, wherein the air bag includes folded portions formed by folding the peripheral portion of the air bag towards the side where the supporting member is located, constraint portions for so constraining the respective folded portions as to release the folded portions at a specified pressure, a first-stage inflated portion located within the area defined by the constraint portions and to be inflated by gas introduced thereinto, and a second-stage inflated portion to be inflated outside the constraint portions.

According to the above structure, when gas flows into an air bag, the first-stage inflated portion is inflated as a smaller air bag which projects forward by a specified distance and projects from the cover by tearing or otherwise opening the cover. The second-stage inflated portion expands in the radial direction around the first-stage inflated portion. Then, when the internal pressure in the air bag reaches a specified value, the constraint portions are released and the folded portions are unfolded and inflated outward so that the first-stage and second-stage inflated portions expand together into a specified shape.

An air bag system is disclosed, wherein the folded portions are so arranged as to expand in a specified direction or directions when the constraint portions are released.

According to the above structure, as the folded portions expand in a specified direction or directions when the constraint portions are released, the direction or directions of expansion of the air bag can easily be controlled.

An air bag system is disclosed, wherein the constraint portions comprise stitch lines formed by stitching together the fabric materials that constitute the air bag along the outline of the folded air bag, each stitch line having a length not exceeding a half of the length of the folded portion on which the stitch line is formed.

According to the above structure, the constraint portions can be easily formed by stitching together the fabric materials of an air bag which has been flatly spread and then folded. Furthermore, each constraint portion can easily be broken by so limiting its length as not to exceed a half of the length of the folded portion.

An air bag system is disclosed, wherein in the state that the first-stage inflated portion of the air bag has expanded and projected forward from the opening that has been formed in the cover due to the expansion of the first-stage inflated portion, the constraint portions are located outside the aforementioned opening.

According to the above structure, unfolding and inflation of the second-stage inflated portions take place outside the cover, and, when the constraint portions are broken, the second-stage inflated portions smoothly expand in the radial direction.

A method of folding an air bag of the invention includes folding a pouch-shaped air bag to be unfolded and inflated by gas introduced thereinto, said method calling for flatly spreading the air bag, folding the peripheral portion of the air bag towards the portion through which gas is introduced, constraining the folded portions in such a manner as to be capable of being released, and folding up the air bag into an appropriate shape to be contained in the space serving as its housing.

According to the above method, when gas flows into the air bag, at first the air bag except for the parts where it is folded and constrained is unfolded and expand and rapidly projects from a cover placed over the air bag by breaking or otherwise opening the cover. However, the distance by which the air bag projects forward at that time is limited because the folded portions are constrained. Then, when the internal pressure in the air bag reaches a specified value, the constraint portions are released so that the folded portions are unfolded and inflated outward.

The above, and other objects, feature and advantages of the present invention will become apparent from the following description read in conjunction with the accompanying drawings in which like reference numerals designate the same element and the scope of the invention will be indicated in the claims.

DETAILED DESCRIPTION OF THE INVENTION

Figure 1A:
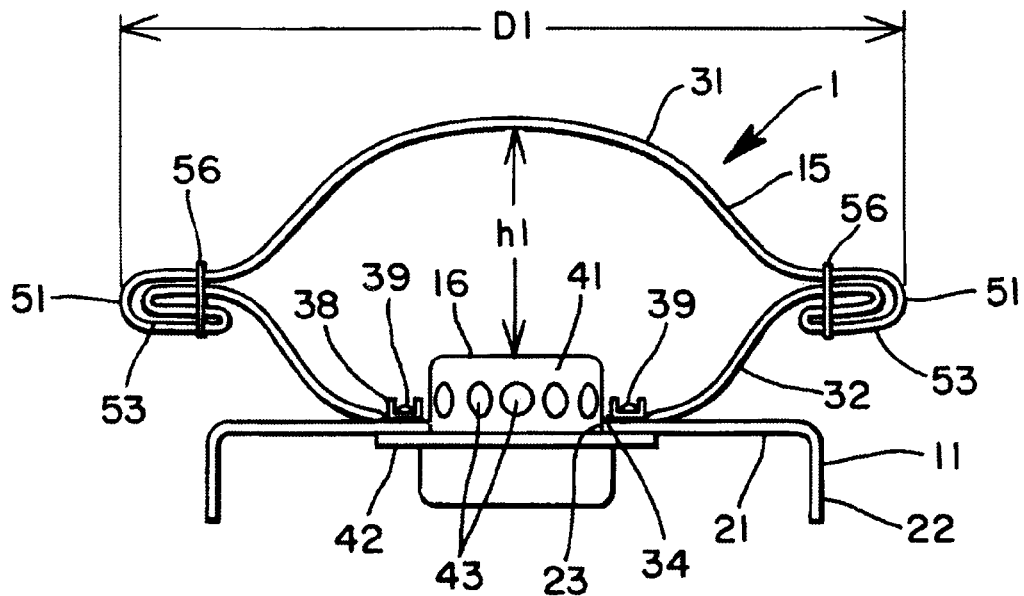
FIG. 1 is a schematic illustration to explain the unfolding and inflating operation of an air bag system according to an embodiment of the present invention, wherein:
 (a) illustrates the initial stage of gas injection;
 (b) illustrates the state where constraint portions are released.

Next, an embodiment of an air bag system according to the invention and a method of folding the air bag of said air bag system are explained hereunder, referring to the drawings.

Figure 2:
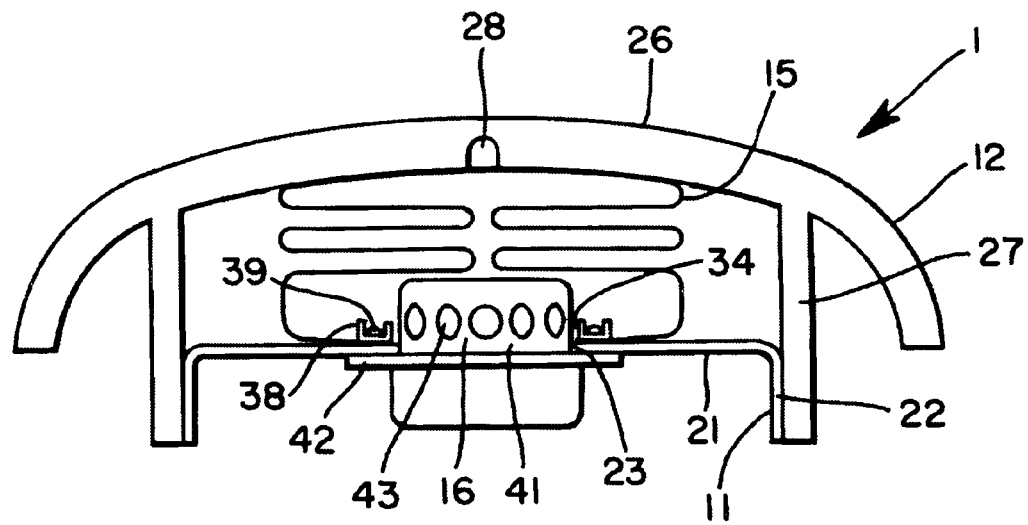
FIG. 2 is a sectional view of said air bag system.

Referring to FIG. 2, numeral 1 denotes an air bag system, which is mounted on a boss portion of tie body of the steering wheel (not shown) of a vehicle so as to protect a passenger of the vehicle (the driver in case of this embodiment) from the shock of a collision. The body of the steering wheel is normally used at an angled position, being attached to a steering shaft whose inclination can be adjusted to an appropriate angle. In the explanation hereunder, the side of the steering wheel facing the driver, in other words the side where air bag system 1 is provided, is referred to as the upper side or the front side, while the side facing the body of the vehicle is referred to as the lower side or the bottom side.

An air bag system 1 essentially comprises a base plate 11 serving as a supporting member, a cover 12 to be attached to base plate 11, an air bag 15, and an inflator 16.

Base plate 11 may be formed by pressing a metal plate and consists of a generally rectangular flat base portion 21 (a flat, generally square shape in case of the present embodiment) and a side plate portion 22 which is formed as an integral body with base portion 21 by bending the peripheral edge of the base portion downward. Base portion 21 is provided with a circular through hole 23 to accept the inflator (hereinafter referred to as inflator through hole 23) and a plurality of through holes 24 which are provided around inflator through hole 23 as shown in, for example, FIG. 3. Side plate portion 22 has a bracket portion (not shown) which is fastened to the body of the steering wheel.

Cover 12 is formed of a synthetic resin as an integral body that comprises a curved cover portion 26 and a mounting portion 27, which is in the shape of a square tube projecting downward from the lower surface of cover portion 26. Cover portion 26 covers the boss portion and a part of the rim portion of the body of the steering wheel The space defined by the underside of cover portion 26 and the inner wall of mounting portion 27 serves as the housing of an air bag 15. Facing this housing, a weak tear line 28, which may be H-shaped or in any other suitable shape, is formed in the back surface of cover portion 26. Mounting portion 27 is fitted around the outer surface of base plate 11 and affixed thereto by means of a plurality of rivets or the like.

Air bag 15 is formed into a flat bag by sewing upper and lower fabric materials 31,32 together around the edge. Of the two fabric materials that are in a flat, circular shape, lower fabric material 32 has at the center a circular hole, which is a gas inlet opening 34 serving as the gas inlet, and a plurality of through holes 35 bored around gas inlet opening 34 as shown in, for example, FIG. 3. Lower fabric material 32 also has a plurality of vent holes 37 to discharge gas out of air bag 15. In the state where gas inlet opening 34 is aligned with inflator through hole 23 of base plate 11, air bag 15 is pressed against base plate 11 by means of an annular retainer 38 disposed in air bag 15 with bolts 39 projecting downward from the underside of retainer 38 through respective through holes 24,35. In this state, air bag 15 is folded into a specified shape and contained in the housing in cover 12.

Inflator 16 comprises a generally cylindrical main body 41, which is provided with a flange portion 42 projecting outward and a plurality of gas injection holes 43 for injecting gas, flange portion 42 formed around the cylindrical wall of main body 41. Inflator 16 structured as above is secured by pushing main body 41 from underneath base plate 11 through inflator through hole 23 into gas inlet opening 34 of air bag 15 until flange portion 42 comes into contact with base portion 21 of base plate 11, and fastening flange portion 42 in this state to base plate 11 with nuts (not shown) tightened around bolts 39.

Next, the procedure of folding air bag 15 is explained referring to FIGS. 3 to 6.

Figure 3:
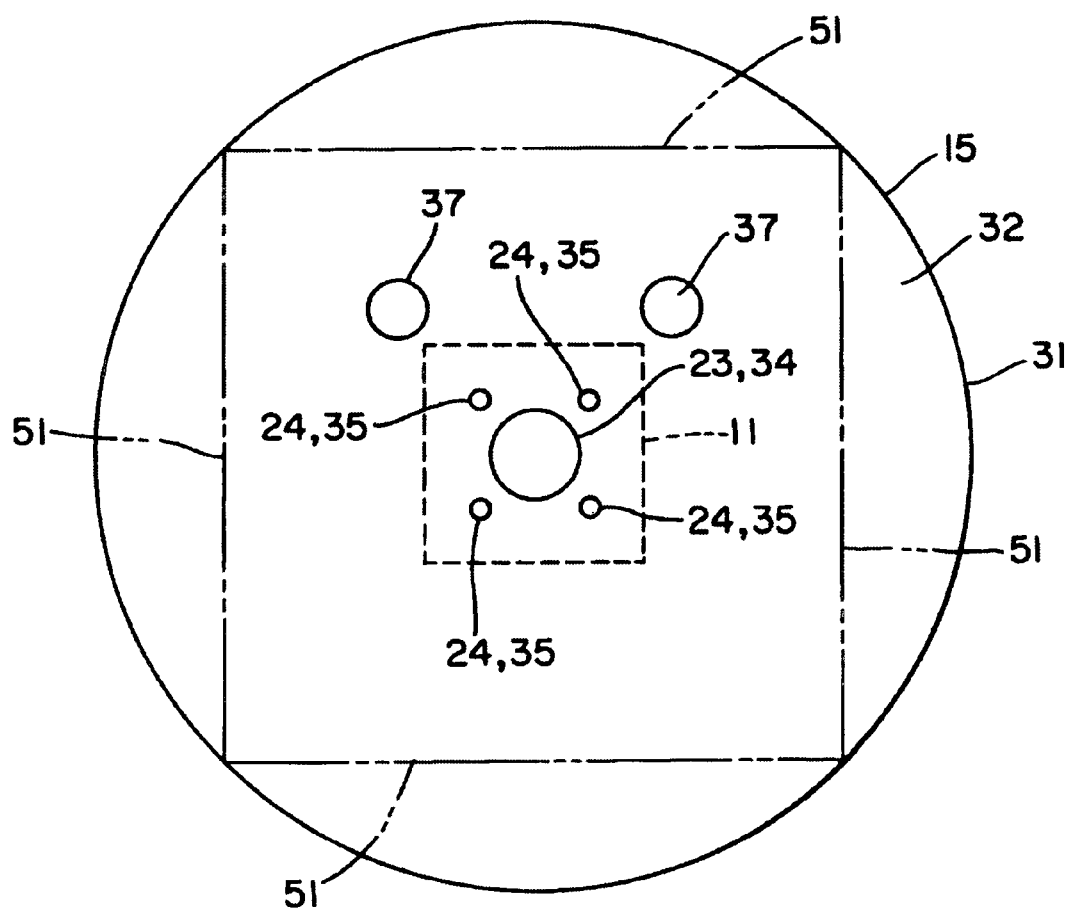
FIG. 3 is a bottom view of an air bag of said air bag system to illustrate the procedure of folding same.

First of all, as shown in FIG. 3, air bag 15 is flatly spread with upper and lower fabric materials 31,32 overlapping each other in close contact.

In this state, the edge of air bag is folded downward along four folding lines 51 consisting of two pairs of opposing lines that constitute the four sides of the square inscribed in the peripheral edge of air bag 15, thereby forming four folded portions 53. The folded air bag 15 is in the shape shown as the first configuration 55 in FIG. 4, whose outline is a square similar to the plane of base plate 11. Then, stitched portions 56 (or stitch lines 56) that serve as constraint portions are formed by stitching each folded portion 53 along folding lines 51, each folding line 51 corresponding to each side of first configuration 55. Stitch lines 56 extend parallel to respective folding lines 51 at a specified distance therefrom. The portion inside of these stitched portions 56 will be the first-stage inflated portion, while folded portions 53 and the outer portion surrounding these stitched portions 56 will serve as the second-stage inflated portion.

Figure 5:
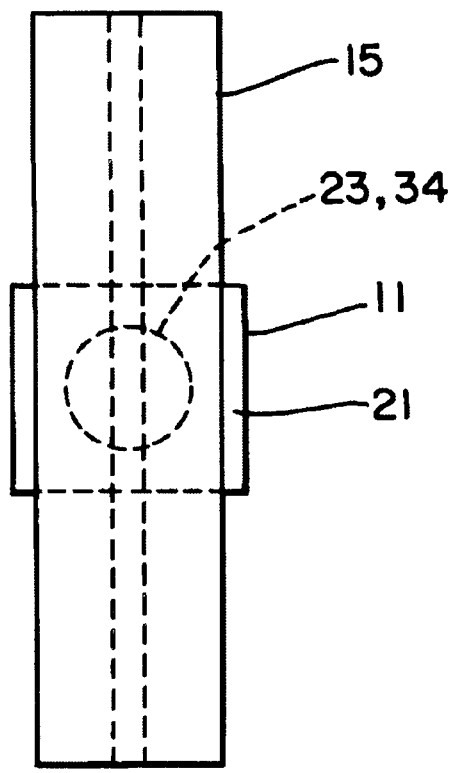
FIG. 5 is a top view of the air bag to explain said folding procedure, showing the step subsequent to that shown in FIG. 4.
Figure 6:
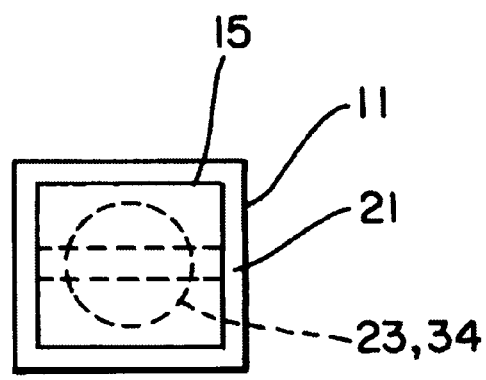
FIG. 6 is a top view of the air bag to explain said folding procedures showing the step subsequent to that shown in FIG. 5.

Then, first configuration 55 is folded inward at the two lateral ends as shown in FIG. 5 (hereinafter referred to as the lateral ends), and subsequently at the upper and lower ends as shown in FIG. 6 (hereinafter referred to as the vertical ends or the upper and the lower ends). By thus folding air bag 15 compact so that it can be placed on base portion 21 of base plate 11, the procedure of folding air bag 15 is completed.

Figure 1B:
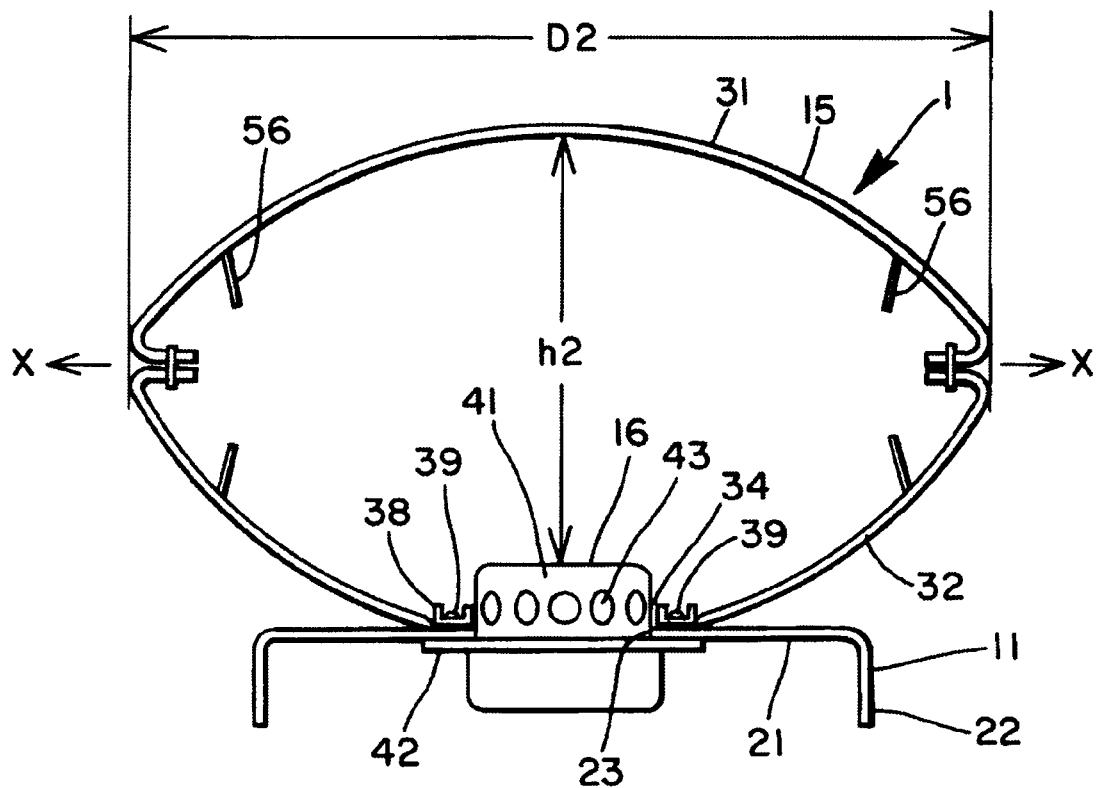

Next, the operation of air bag 15 is explained referring to FIG. 1, in which the illustration of cover 12 is omitted in order to explain how air bag 15 is spread and inflated.

When a vehicle equipped with said air bag system 1 receives a shock resulting from a collision of the vehicle, a control unit (not shown) incorporated in air bag system 1 or in the body of the vehicle detects the shock and feeds the power to inflator 16 to be actuated so that gas is suddenly injected through gas injection holes 43 of inflator 16 into folded air bag 15. As a result, air bag 15 is inflated and unfolded, thereby tearing cover 12 along tear line 28 and opening cover portion 26 of cover 12 like doors. As a breakthrough opening has thus been formed, air bag 15 is projected from cover 12 through this opening and continues to be unfolded and inflated at the same the in front of the driver.

At the first stage of the aforementioned process of being unfolded and inflated, air bag 15 begins to be unfolded from the folded portions at the four ends while it begins to be inflated from the portion near gas inlet opening 34, in other words the first-stage inflated portion, in the forward direction. During this first unfolding stage, airbag 15 is constrained with folded portions 53 sewed down at respective stitched portions 56, which have a specified strength. Therefore, air bag 15 functions in a sense as a smaller air bag whose top view is the first configuration 55; as shown in FIG. 1 (a), it is inflated only to specified dimensions of width D1 and height h1. As a result, the pressure is concentrated to the middle portion of air bag 15, allowing air bag 15 to smoothly tear line 28 and rapidly project out of cover 12.

Then, when the internal pressure in air bag 15 exceeds a specified value due to the gas supplied from inflator 16, threads of stitched portions break, thereby releasing air bag 15. This initiates the second stage of inflation, wherein folded portions 53, i.e. the second-stage inflated portions, instantly rotate, allowing the gas to flow in the radial direction towards the sides of the air bag (in the directions represented by allows X in FIG. 1 (b), in other words towards the peripheral edge of the air bag) so that air bag 15 expands to the maximum dimensions of width D2 and height h2. At that time, expansion of folded portions 53 projects air bag 15 more radially than forward, because the tensile force of the radial expansion limits the expansion in the forward direction. Furthermore, as the second-stage inflated portion is sewed together at the middle, the air bag smoothly expands towards the circumferential edge of the air bag as if being divided into a plurality of chambers.

As described above, according to the structure of the present embodiment of air bag system 1, wherein air bag 15 is folded and sewed together at the circumferential end and subsequently folded to be placed in the housing, air bag 15 is capable of rapidly breaking cover 12 and projecting therefrom in the initial stage of expansion. When stitched portions 56 constraining air bag 15 are broken, as air bag 15 expands mainly towards its circumferential edge, thereby limiting the forward projection, air bag 15 is prevented from projecting prominently and narrowly forward.

Other benefits of tie present embodiment lie in that as forward projection of air bag 15 can be limited without requiring a particular member such as a strap to bind a fabric material of the air bag, it is capable of reducing production costs by reducing parts (materials), simplifying the production process, increasing yield and so forth, and also reducing the weight and the volume of the folded air bag.

Figure 4A:
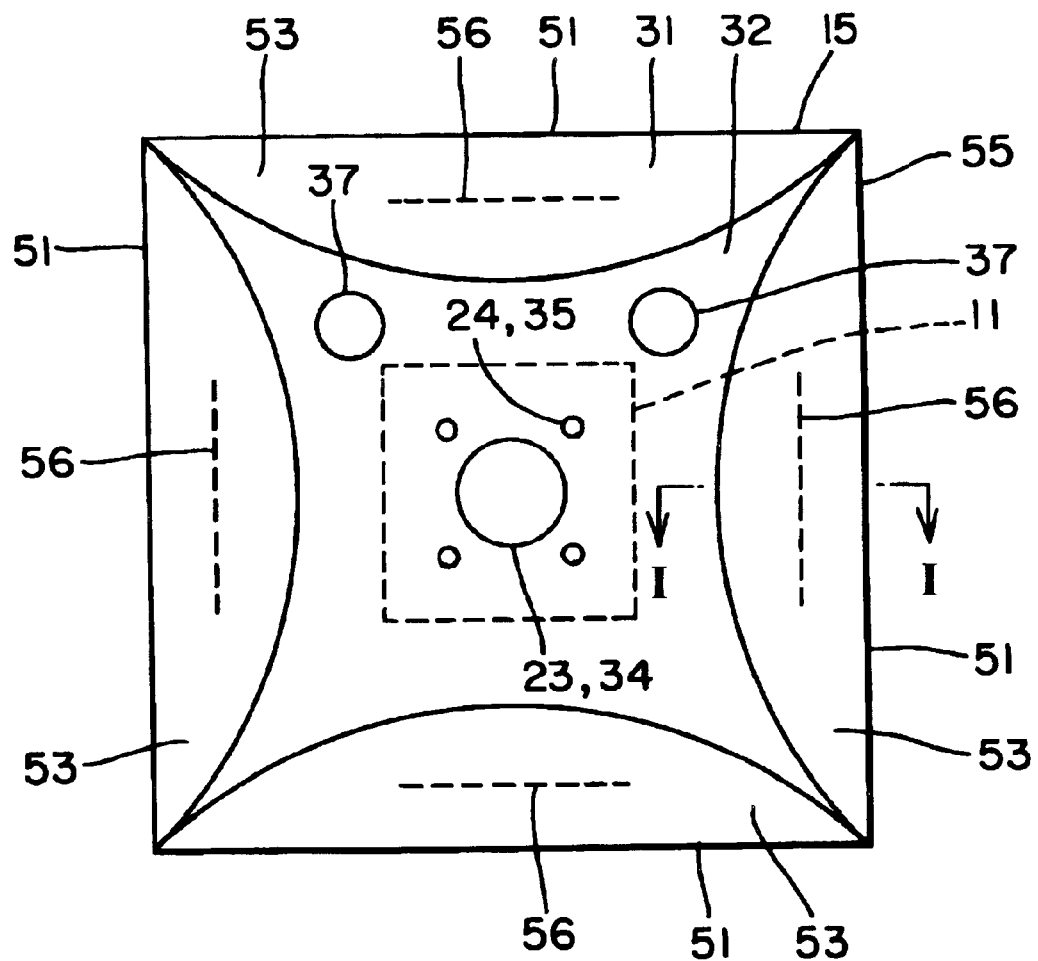
FIG. 4 is a schematic illustration to explain the folding procedure, showing the step subsequent to that shown in FIG. 3, wherein:
 (a) is a bottom view;
 (b) is a sectional view taken along line I—I in (a).
Figure 4B:
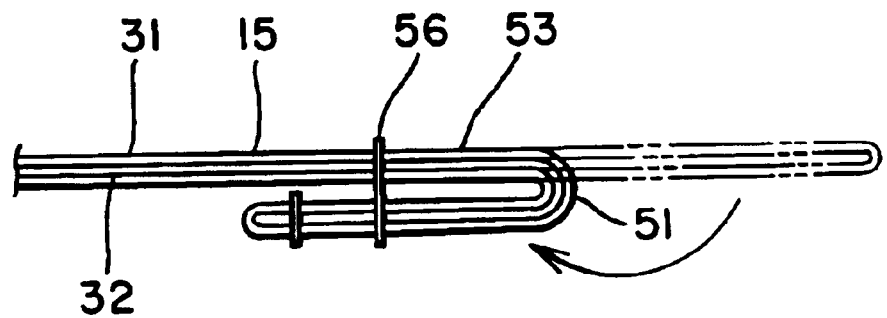

Another benefit of the embodiment lies in that air bag 15 in the constrained state is formed into the shape shown as the first configuration 55 in FIG. 4, which resembles the top view of base plate 11. This structure not only permits the air bag to function effectively as a smaller air bag when unfolded but also to be folded smoothly and easily, because there is no need of starting the folding operation from the state where the air bag is spread to its maximum size.

Furthermore, as an air bag having the structure according to the embodiment can be produced simply by folding a conventional air bag at specified positions and stitching the folded portions, the structure of the present embodiment is capable of reducing production costs by the simplified production process.

As an air bag 15 explained above is formed by sewing together flat, circular fabric materials 31,32, it expands into a shape resembling a flattened ball so as to cover the steering wheel and effectively protect the driver when completely expanded. However, in cases where the air bag is to be attached to a different seat such as the passenger seat, it may be of a different shape.

Figure 7:
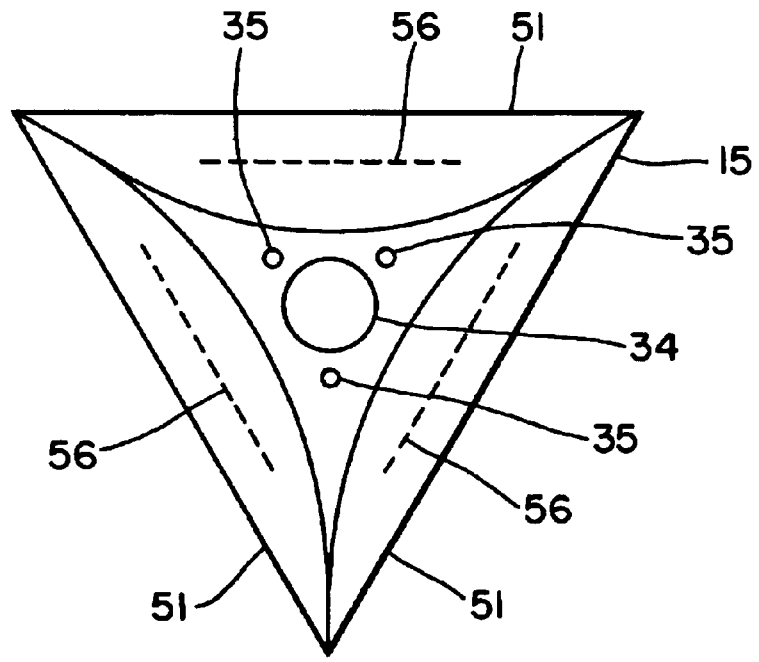
FIG. 7 is a bottom view of an air bag to illustrate the procedure of folding same according to another embodiment of the invention.
Figure 8:
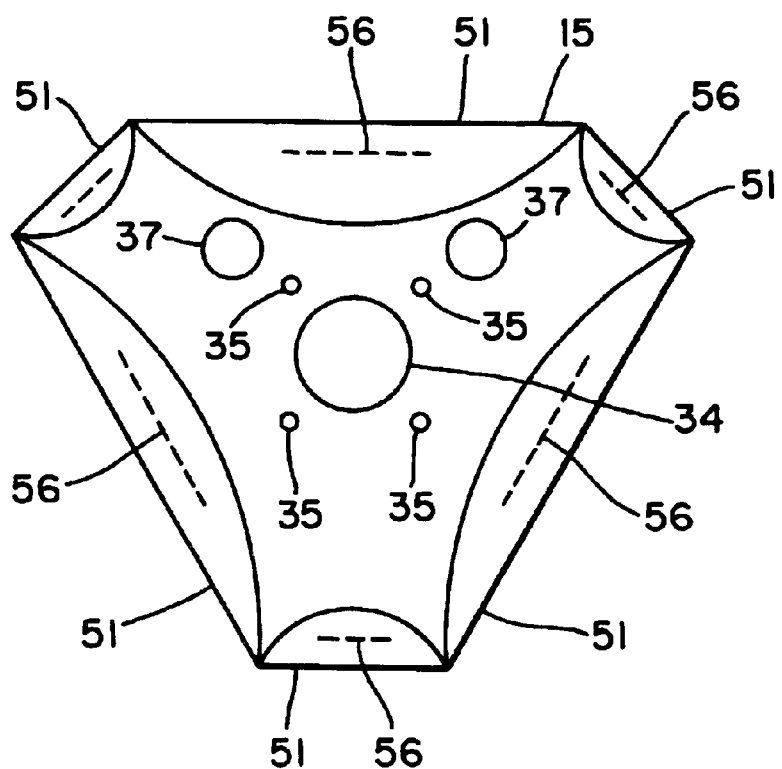
FIG. 8 is a bottom view of an air bag to illustrate the procedure of folding same according to yet another embodiment of the invention.

Although the invention is explained referring to the above embodiment, wherein air bag 15 is folded along four folding lines 51 so as to be formed into a flat, rectangular shape shown as the first configuration 55, air bag 15 may be in various shapes, such as a triangle, a pentagon or any one of other polygons which can be fitted in the cover. For example, as shown in FIG. 7, it may be a triangle having folding lines 51 and stitched portions 56 at three locations, or a hexagon shown in FIG. 8 which has folding lines 51 and stitched portions 56 at six locations.

Although folded portions 53 and stitched portions 56 are provided generally in the manner of central symmetry along the entire circumference of air bag 15 according to the above embodiment, air bag 15 may be folded and stitched at a location or locations biased in a specified direction or directions with respect to the neutral steering position. For example, taking into consideration where the horizontal extension of tear line 28 of cover 12 is located, air bag 15 may be provided with two full-size folded portions and constrained at stitched portions respectively formed at said folded portions, which are located near the vertical ends of the air bag. In this case, the two lateral ends may have no folded portions or have small folded portions and short stitches formed thereat. The above structure permits the air bag to not only unfold itself more easily, thereby breaking tear line 28 smoothly as if opening doors, but also expand laterally rather than in the vertical direction (in the fore-and-aft direction with respect to the body of the vehicle while limiting the forward projection (projection towards the driver) of the air bag. In another structure, air bag 15 may be constrained either at a total of three folded portions that are respectively formed near both lateral ends and the upper end as shown in FIG. 7 (the end closer to the windshield) or at these three folded portions in addition to a smaller folded portion which is so formed near the lower end (the end facing the lower front part of the driver) as to be smaller than the folded portions at the two lateral ends. This structure permits the air bag formed into the first configuration to expand smoothly towards the abdomen of the driver.

Furthermore, although stitched portions 56 that use breakable threads constitute the constraint portions in the embodiments described above, constraint portions which can be released may be formed by using other means such as various bonding agents or a Hook-and-Loop fastener. For example, in a structure using a bonding agent, a constraint portion may be formed simply by applying the bonding agent to specified locations on fabric material 31 and applying pressure to those locations. In cases where a Hook-and-Loop fastener or fasteners are used, the fastener or fasteners may be attached to specified parts of fabric material 31 of air bag 15. As constraint portions can be easily formed by folding flatly spread fabric material 31 and pressing the folded portions, this structure is effective in reducing production costs.

Figure 9:
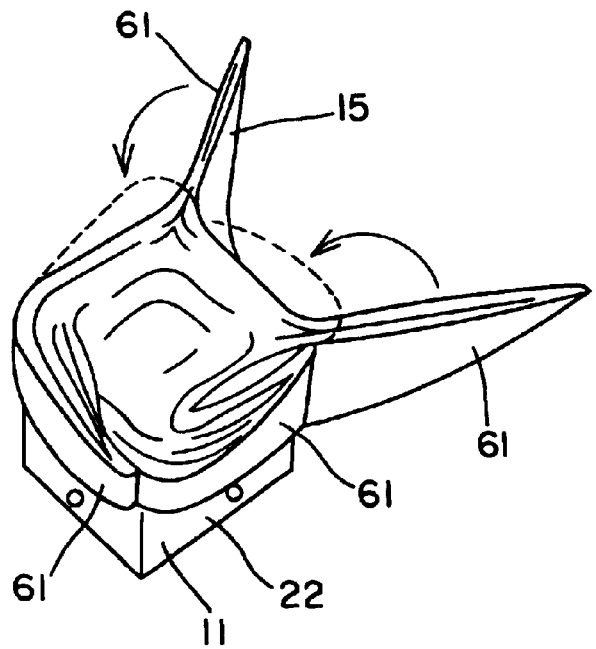
FIG. 9 is a perspective view of an air bag to illustrate the procedure of folding same according to yet another embodiment of the invention.
Figure 10:
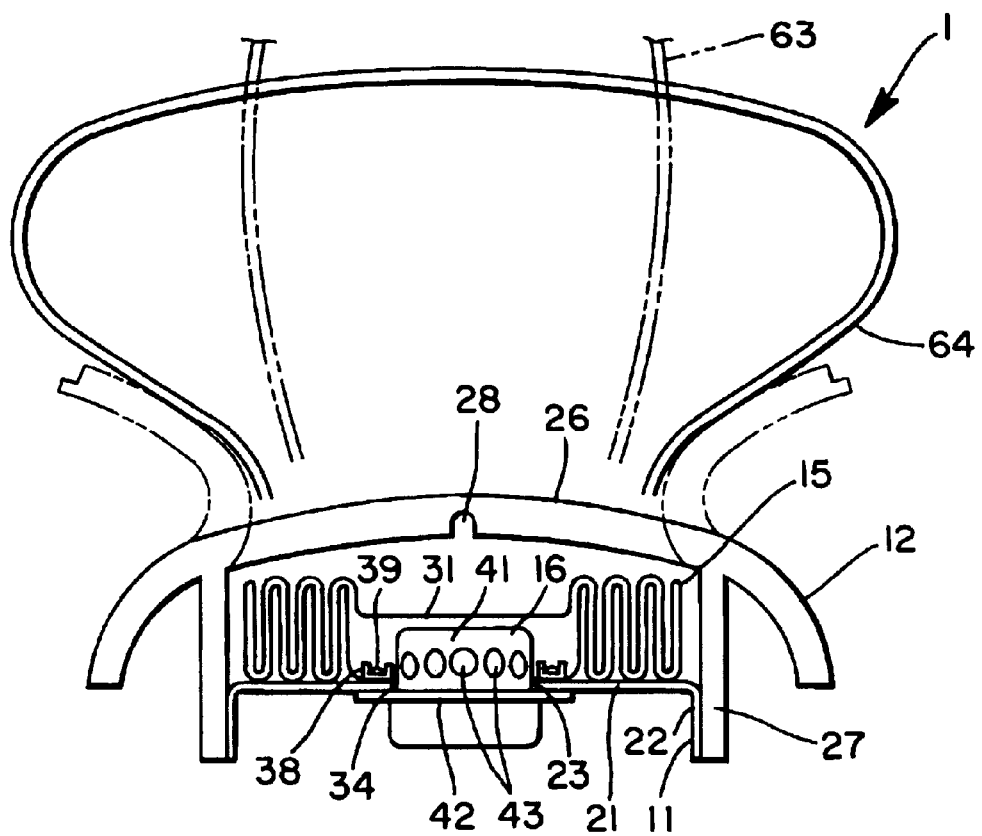
FIG. 10 is a schematic illustration to explain the unfolding and inflating operation of the air bag system shown in FIG. 9.
Figure 11A:
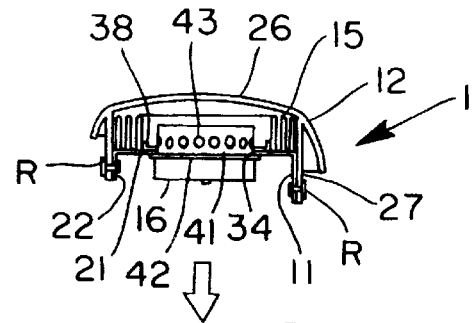
FIG. 11 is a sectional view taken along line II—II in FIG. 12 of an air bag system according to another embodiment of the invention to explain the unfolding and inflating operation of same.
Figure 11B:
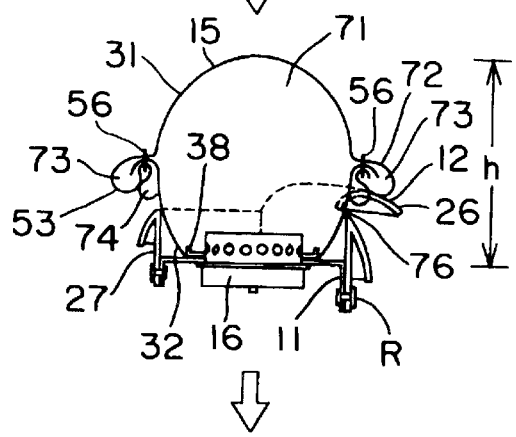
Figure 11C:
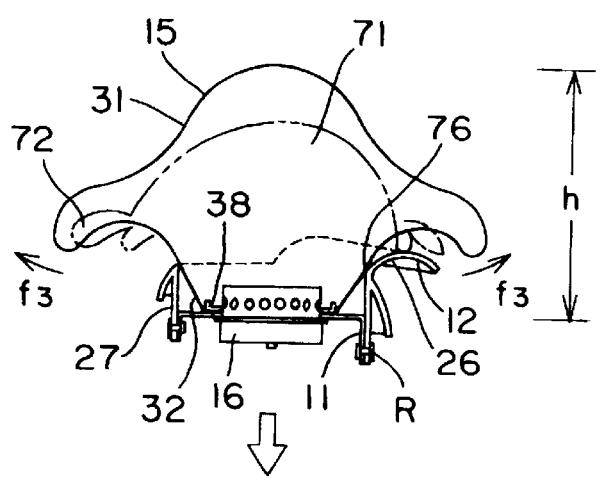
Figure 11D:
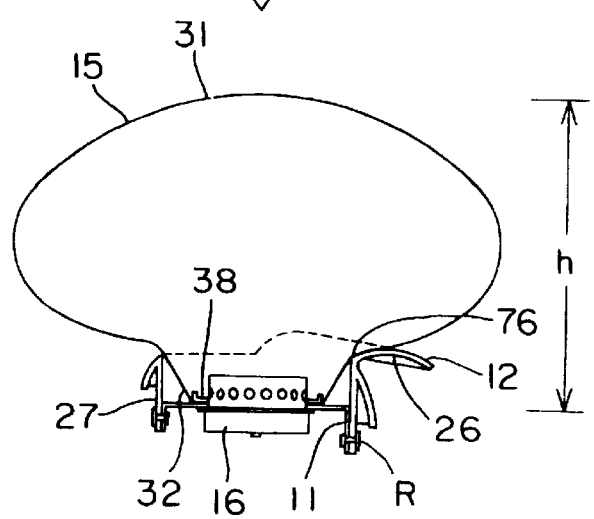
Figure 12A:
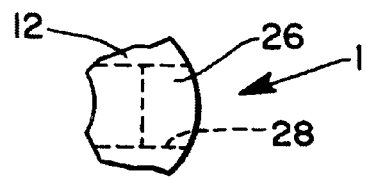
FIG. 12 is a top view of said air bag system to explain the unfolding and inflating operation of same.
Figure 12B:
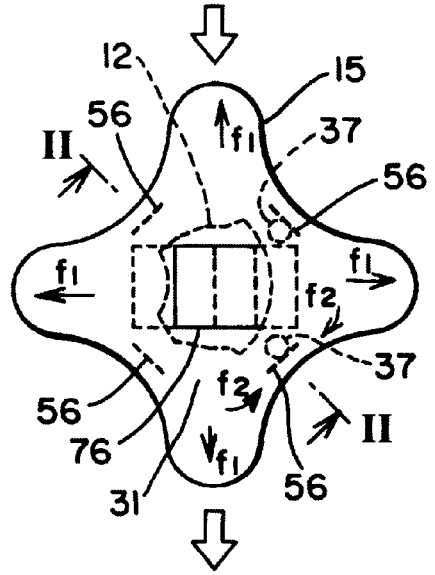
Figure 12C:
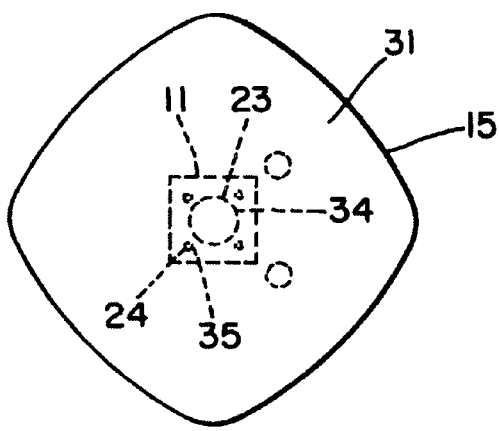
Figure 12D:
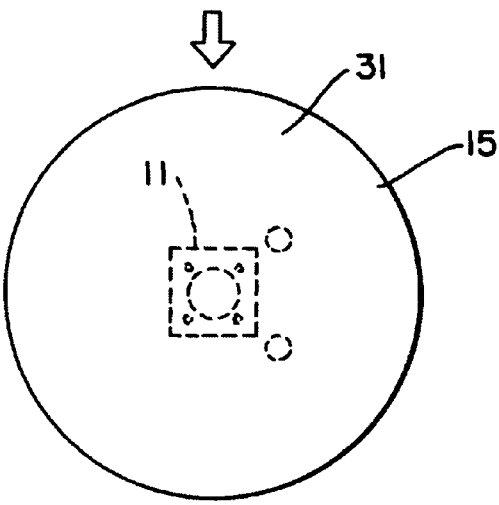
Figure 13:
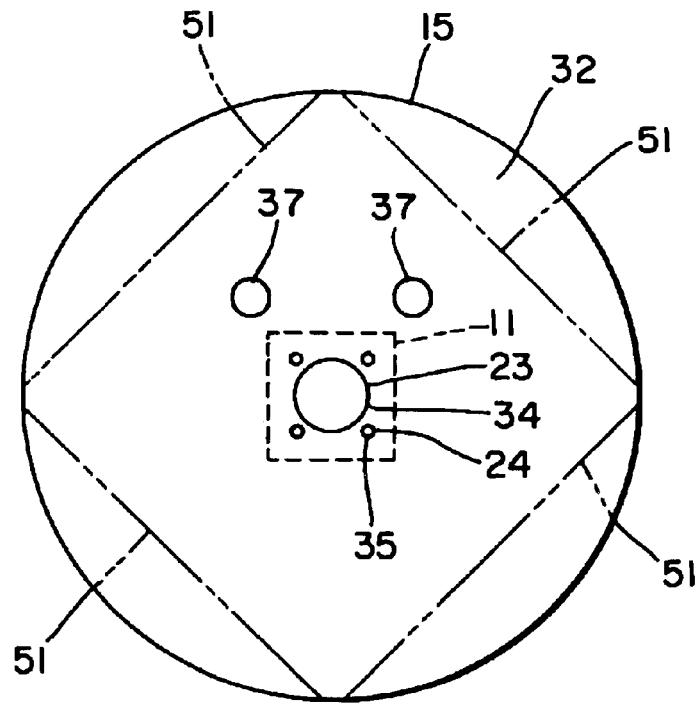
FIG. 13 is a bottom view of said air bag system to illustrate the procedure of folding the air bag of same.

Furthermore, according to the embodiment described above, air bag 15 is first folded and stitched to be formed into the first configuration 55, and both sides are subsequently folded and then the two vertical ends are folded so that air bag 15 can be placed on inflator 16. However, air bag 15 can be folded in other ways, an example of which is shown in FIGS. 9 and 10, wherein air bag 15 is first formed into the first configuration 55 and subsequently folded into a wave-like shape over inflator 16, and then folded into a shape resembling flower petals by wrapping overhanging portions 61 around the portion that has been folded. As there is virtually one layer of fabric material 31 right in front of inflator 16, tear line 28 of cover 12 can be torn instantly by gas generated by inflator 16. Furthermore, by means of stitched portions or otherwise formed constraint portions, air bag 15 can be prevented from projecting forward in a narrow shape as the one represented by imaginary lines 63, and can instead by smoothly inflated in the radial direction as shown in solid lines 64.

Next, another embodiment of the invention is explained hereunder, referring to FIGS. 11 to 15. The elements similar to those in the embodiment described above are identified with the same reference numerals, with the explanation thereof being omitted. According to the second embodiment, as shown in FIG. 11 (a), an air bag system 1 comprises a base plate 11, an air bag 15 folded into a flower-like shape, an inflator 16, and a cover 12 mounted on case plate 11 by means of rivets R, air bag 15 and inflator 16 fastened to base plate 11 by means of bolts of a retainer 38.

Figure 14:
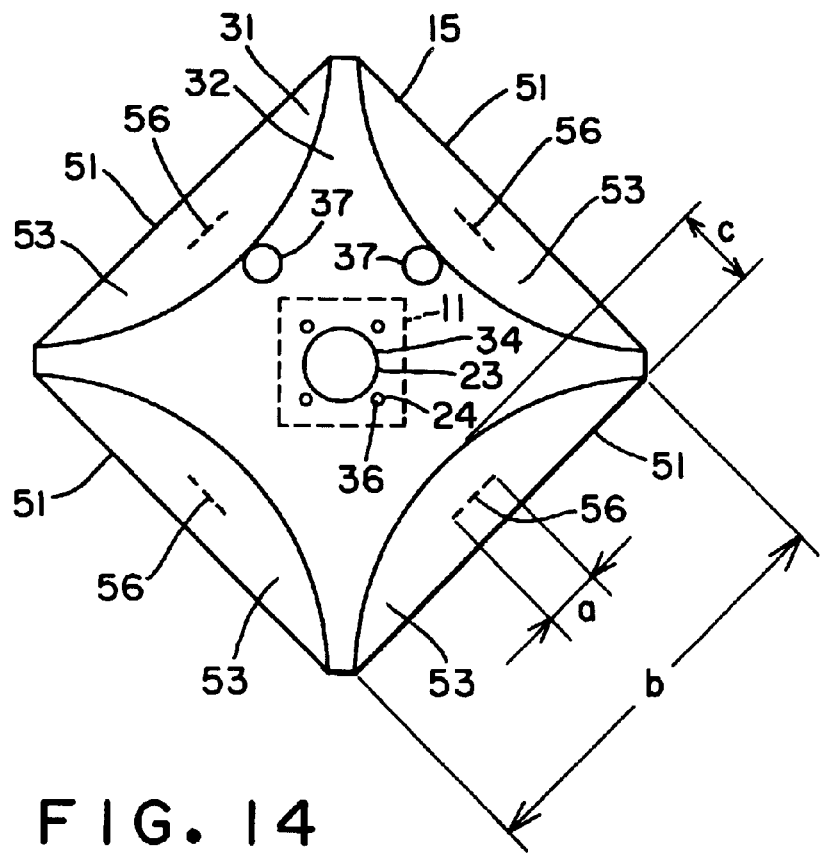
FIG. 14 is a bottom view of said air bag system to illustrate he procedure of folding the air bag of same.
Figure 15:
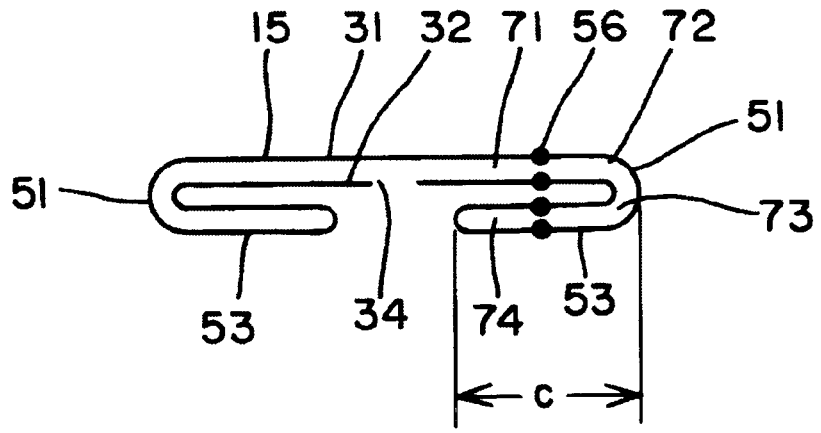
FIG. 15 is a schematic illustration of a folded air bag to illustrate the folding operation of same.

The procedure of folding air bag 15 described above is shown in FIGS. 13 and 14, wherein air bag 15 which is flatly spread out in a circle is folded down towards the bottom along four folding lines 51 into a generally rectangular shape pointed at the top and bottom as well as at the right and left ends. Each folding line 51 forms an arc-shaped folded portion 53 connected to the adjacent folding lines at the respective two ends. Then, each folded portion 53 is sewed to the flat portion of the air bag fabric at a stitched portion or stitch line 56 at a specified location and serves as a constraint portion as referred to the claims. As shown in FIGS. 14 and 15, each stitched portion 56 is formed by sewing together fabric materials 31,32 with a thread, the fabric materials overlapping each other in a total of four layers. Each stitched portion 56 consists of 3 to 5 stitches, with a total length a of approximately several millimeters but not exceeding a half of the length of folded portion 53, and extends along the outer edge of folded portion 53, at some distance from the outer edge. Air bag 15 is stitched by machine upside down, with the front side facing downward. The needle thread has to be stronger than the bobbin thread; for example, the needle thread may be of 1260 deniers while the bobbin thread may be of 840 deniers.

Each stitched portion 56 extends nearly parallel to the adjacent folding line 51 at a distance shorter than distance c between folding line 51 and the end of the folded portion formed by folding the fabric along said folding line 51. In other words, each stitched portion 56 is formed between folding line 51 and the end of its folded portion. The inner part surrounded by these stitched portions 56, i. e. the part gas inlet opening 34 is located, serves as the first-stage inflated portion 71, and the part surrounding these stitched portions 56 serves as the second-stage inflated portion 72.

Air bag 15 formed as above is then affixed to base plate 11 and folded into a wave-like shape by means of, for example, pressing each folded portion 53 against the middle portion or base plate 11. By wrapping the overhanging portions around the body of the air bag that has thus been folded and placing cover 12 over air bag 15, the procedure of folding air bag 15 is completed.

Next, the inflation operation of air bag system 1 described above is explained hereunder referring to FIGS. 11 and 12, in which (a) to (d) of FIG. 11 respectively illustrate the air bag at the same stages as those depicted in (a) to (d) of FIG. 12.

When air bag system 1 is actuated in the state shown in FIG. 11 (a) and FIGS. 12 (a), gas injected from inflator 16 flows into air bag 15 so that the first-stage inflated portion 71 expands while each space between two adjacent stitched portions 56 is inflated radially as shown by arrows f1. As shown in FIG. 11 (b) and FIG. 12 (b), the air bag is thus inflated into the first-stage unfolded shape that resembles a flattened concave-sided diamond. Meanwhile, the gas flows between stitched portions 56 towards the outer part of the air bag, thereby inflating the outer part as shown by arrows f2 and forming the second-stage inflated portion 72. The second-stage inflated portion 72 consists of a first sub chamber 73 communicating with the first-stage inflated portion 71 and having a U-shaped cross section, and second sub chambers 74 which are formed by the gas flowing between stitched portions 56 to the end of each folded portion 53. First sub chamber 73 and second sub chambers 74 can be identified in the sectional view shown in FIG. 11. In the top view in FIG. 12, however, they appear as a single donut-like shape surrounding stitched portions 56.

In the state where first-stage inflated portion 71 is inflated, cover portion 26 of cover 12 is tom along tear line 28 and opened like doors in the fore-and-aft direction with respect to the body of the vehicle, so that an opening 76 ranging tom both side portions of tear line 28 to the portions that serve as the hinges of the doors is formed. This opening 76 has virtually the same dimensions as the part surrounded by mounting portion 27. Air bag 15 is so arranged that when the first-stage and second-stage inflated portions 71,72 are in the expanded state prior to breakage of stitched portions 56, stitched portion 56 and second-stage inflated portion 72 are located outside opening 76, at the front side of the system.

As the gas supply continues, the pressure of the gas breaks stitched portions 56, so that air bag 15 is unfolded and inflated from the shape shown in two-dot chain line in FIG. 11 (c) to the shape shown in solid line in FIG. 11 (c) and FIG. 12 (c). At that time, as folded portions 53 are unrolled in the direction represented by arrow f3, allowing high pressure gas to rush in the radial direction into folded portions 53, air bag 15 is unfolded and expands in the radial direction with virtually no change in height h. When the gas supply continues further, air bag 15 expands to a somewhat flattened circular shape shown in FIG. 11 (d) and FIG. 12 (d) so that it is capable of snugly cushioning the driver over a wide area.

As described above, while having the same effect as those of an air bag system according to the embodiments described above, the present embodiment is capable of inflating air bag widely while limiting the forward projection of air bag 15, which is the projection towards the driver, because air bag 15 is constrained at stitched potions 56 in such a manner as to be released whenever it is necessary. Especially because each stitched portion 56 is formed by stitching together four layers of fabric materials 31,32 at the middle of a folded portion 53 where the fabric materials are folded towards the bottom side, a plurality of sub chambers 73,74 can easily be formed adjoiningly to stitched portions 56. By means of inflating these sub chambers 73,74, the forward projection of the air bag can be effectively limited. As shapes and volumes of sub chambers 73,74 can easily be adjusted by changing length a and/or the locations of respective stitched portions 56, the inflation characteristics can easily be changed by means of such adjustment to obtain the appropriate characteristics. As appropriate inflation characteristics can be obtained by a simple means such as providing stitched portions 56 described above, there is no need of a complex structure such as those requiring straps. Therefore, the structure according to the above embodiment is capable of reducing production costs and the dimensions of a system.

As a result of experiments, it has been found that limiting length a of each stitched portion 56 up to a half of length b of folding line 51 adjacent thereto enables the smooth expansion of sub chambers 73,74 as shown in FIG. 14 and other drawings, effectively limits the forward projection of the air bag and also permits stitched portions 56 to break properly, thereby smoothly inflating air bag 15 to its fullest extent.

Figure 16:
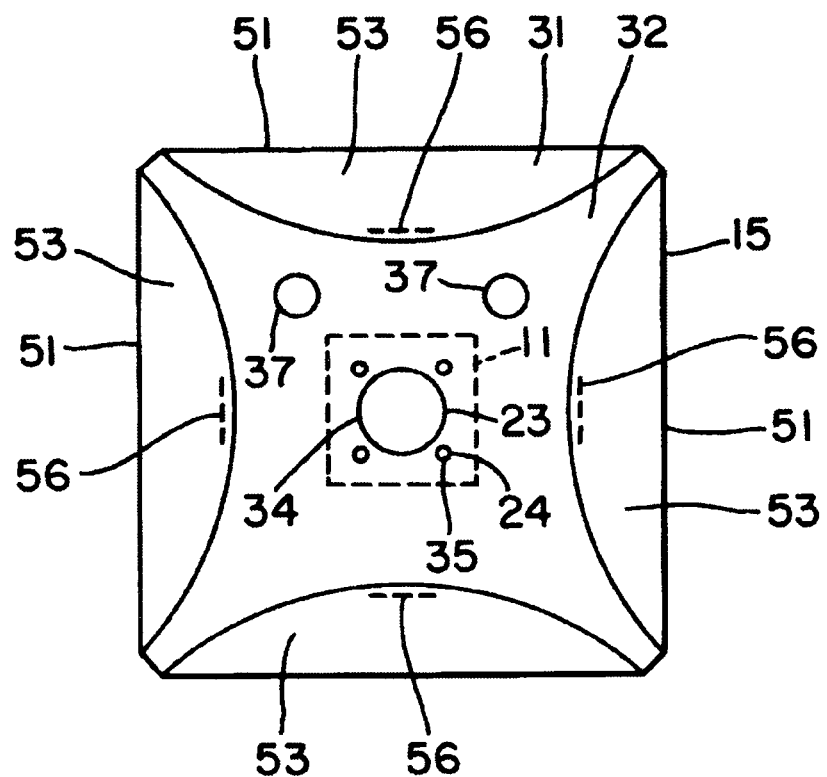
FIG. 16 is a bottom view of said air bag system to illustrate the procedure of folding an air bag of same according to yet another embodiment of the invention.
Figure 17:
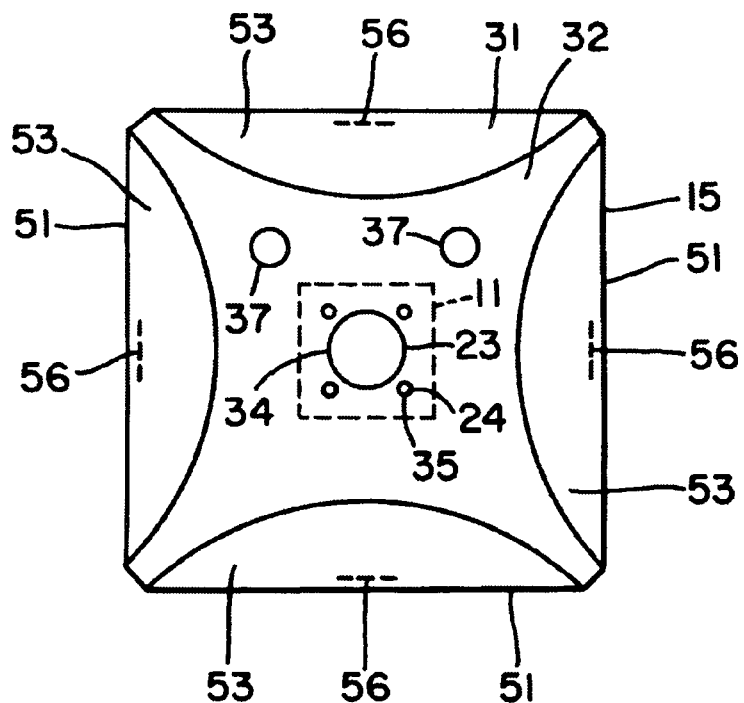
FIG. 17 is a bottom view of said air bag system to illustrate the procedure of folding an air bag of same according to yet another embodiment of the invention.

According to the embodiment shown in FIG. 14, each stitched portion 56 is formed virtually a half way between folding line 51 and the end of its folded portion. However, a stitched portion 56 may be formed near the end of each folded portion as shown in FIG. 16 or near folding line 51 as shown in FIG. 17.

Furthermore, four stitched portions 56 need not necessarily be formed in an identical manner; various stitching conditions may be employed for respective stitched portions 56 in accordance with whether there is a hinge part at a part of cover 12 to be opened like a door or, in an alternative form, stitched portions 56 may be formed only at the upper and the lower ends where the hinge parts are provided.

As the forward projection of air bag 15 can be limited by stitched portions 56, a part of second-stage inflated portion 72 stay be still inside opening 76 of cover 12, in other words inside the housing of air bag 15, when first-stage inflated portion 71 is formed. This means that, for example, a part of or the entire second sub chambers 74 may be inside cover 12.

Furthermore, there is no need for stitched portions 56 to be always formed in straight lines along folding lines 51; they may be formed in the radial direction on air bag 15 or in a shape other than a straight line, such as a wave-like shape.

In another alternative form, a stitched portion 56 may consist of a plurality of stitched lines. With such a structure, the process of inflating air bag 15 can be controlled in a number of stages.

Figure 18:
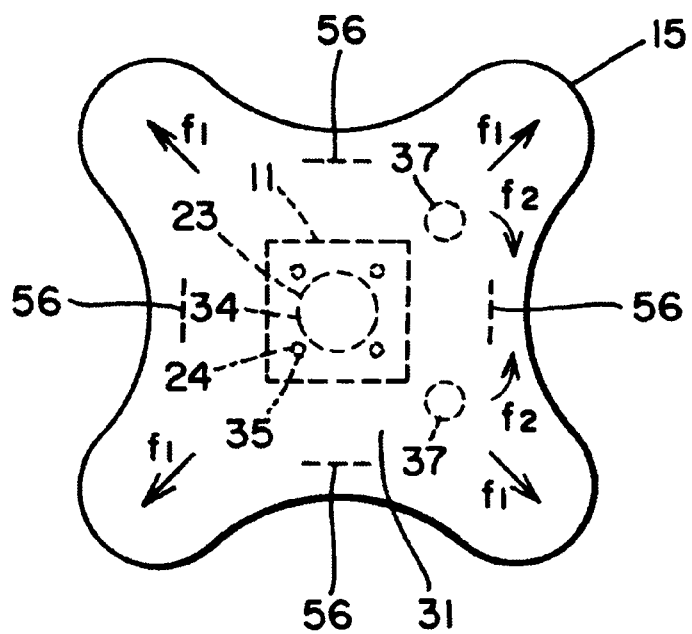
FIG. 18 is a top view of said air bag system to illustrate the unfolding and inflating operation of same according to yet another embodiment of the invention.

In addition to the arrangement of the stitched portions and the cover shown in FIG. 12 and other drawings according to the above embodiment, other arrangements are also possible, including the one shown in FIG. 18, wherein stitched portions 56 are provided to the front and back and left and right of inflator through hole 23 so that the air bag expands into an X-like shape at the first stage of inflation.

Furthermore, an air by system according to the present invention can be used not only as an air bag system mounted on the steering wheel of a vehicle but also as an air bag system to be installed in other parts, including and not limited to the passenger seat, a seat of another type or a door. In addition, the invention is also applicable to reducing a shock received by a moving body which may not necessarily be a vehicle.

According to the structure of an air bag system of the invention, when gas flows into an air bag, the middle part of the air bag surrounded by the portions which are stitched together projects forward by a specified distance, and, when the internal pressure in the air bag reaches a specified value, the stitched portions are released and the folded portions are unfolded and inflated outward. Thus, the structure is capable of limiting the forward expansion of the air bag and allowing the air bag to smoothly expand in the radial direction. As an air bag having the structure according to the invention can be produced simply by folding a conventional air bag at specified positions and stitching the folded portions, the invention provides a simplified production process and therefore is capable of reducing production costs.

According to the structure of an air bag system of the invention, when gas flows into an air bag, the first-stage inflated portion is inflated and functions in a sense as a smaller air bag, which projects forward by a specified distance and projects from the cover by, for example, tearing a part of the cover, and the second-stage inflated portion expands radially around the first-stage inflated portion. Then, when the internal pressure in the air bag reaches a specified value, the constraint portions are released and the folded portions are unfolded and inflated outward so that the first-stage and second-stage inflated portions expand together into a specified shape. As described above, the air bag is inflated forward effectively so as to project forward from the cover rapidly and by a specified distance in the initial stage of expansion, and subsequently inflated into its final inflated shape with the folded portions unfolded and inflated outward when the constraint portions are released. Therefore, the invention provides at less production costs an air bag system whose air bag can be folded into a compact shape than those provided by conventional structures which call for attaching another member such as a strap by means of sewing. Furthermore, compared with conventional structures such as one calls for stitching together the fabrics of a flatly spread air bag at a specified position or positions and subsequently folding up the stitched air bag, another which calls for tucking in the hem of an air bag and stitching the tucked portion, or yet another structure which calls for providing breakable ear portions around the circumferential edge of an air bag, bending these ear portions towards the bottom of the air bag and securing them, an air bag system according to the invention is capable of unfolding and inflating an air bag more smoothly, and also capable of expanding folded portions smoothly in the radial direction, towards the circumferential edge of the air bag, when constraint portions are released. As an air bag having the structure according to the invention can be produced simply by folding a conventional air bag at specified positions and stitching the folded portions, the invention provides a simplified production process and therefore is capable of reducing production costs.

According to the invention, the folded portions expand in a specified direction or directions when the constraint portions are released. Therefore, an air bag system is capable of easily controlling the direction or directions of expansion of the air bag is provided.

According to the invention, the constraint portions are comprised of stitch lines formed by stitching together fabric materials that constitute the air bag. Therefore, an air bag system that the constraint portions can be easily formed simply by folding the fabric materials of a flatly spread air bag and stitching the fabrics together is provided. Furthermore, by forming each stitch line along the outline of the folded air bag and limiting the length of each stitch line to a half or less of the length of the folded portion on which the stitch line is formed, the stitch lines can be ensured to break smoothly.

According to the invention, when the first-stage inflated portion has expanded and projected forward from the opening that has been formed in the cover due to the expansion of the first-stage inflated portion, the constraint portions are located outside said opening. Therefore, an air bag system which is capable of inflating the second-stage inflated portions outside the cover so that the second-stage inflated portions smoothly expand in thee radial direction when the constraint portions are broken is provided.

According to the method of folding an air bag of the invention, when gas flows into an air bag, at first the air bag except for the parts where it is folded and constrained is unfolded and expand and rapidly projects from a cover placed over the air bag by tearing or otherwise opening the cover. The distance by which the air bag projects forward at that time is limited because the folded portions are constrained in that stage. Then, when the internal pressure in the air bag reaches a specified value, the constraint portions are released and the folded portions are unfolded and inflated outward so that the entire air bag is unfolded and expands into its final inflated shape. Therefore, the method as claimed in the invention is capable of reducing production costs of an air bag and folding the air bag into a compact shape compared with those provided by conventional arts which call for attaching another member such as a strap by means of sewing. Furthermore, compared with conventional methods such as one calls for stitching together the fabrics of a flatly spread air bag at a specified position or positions and subsequently folding up the stitched air bag, another which calls for tucking in the hem of an air bag and stitching the tucked portion, or yet another method which calls for providing breakable ear portions around the circumferential edge of an air bag, bending these eat portions towards the bottom of the air bag and securing them, the method according to the invention permits the air bag to rapidly project out of its cover and is also capable of limiting the forward projection of the air bag when the constraint portions are released.

What is claimed is:

1. An air bag system comprising:

an air bag to be unfolded and inflated by gas introduction into the air bag, the air bag having folded portions formed by folding a peripheral portion of a flatly spread flat portion toward a center portion of the flatly spread portion, and each folded portion stitched to the flat portion at a constraint portion located within the folded portion; and the constraint portions further including stitch lines joining the flat portion and each folded portion, each stitch line being parallel to a respective folding line and at a predetermined distance therefrom, and each stitch line further having a length not exceeding a half length of the folded portion on which the stitch line is formed.

2. An air bag system comprising:

an air bag to be unfolded and inflated by gas introduction into the air bag;

a cover for containing the air bag in a covered state;

a supporting member for supporting the air bag, the air bag having folded portions formed by folding a peripheral portion of a flatly spread flat portion of the air bag towards a side where the supporting member is located, and each folded portion being stitched to the flat portion at a constraint portion located within the folded portion for constraining the folded portions and for releasing the folded portions at a specified pressure;

a first-stage inflated portion located within an area defined by the constraint portions and being inflated by gas introduction into the air bag;

a second-stage inflated portion being inflated outside the constraint portions; and the constraint portions further including stitch lines joining the flat portion and each folded portion, each stitch line being parallel to a respective folding line and at a predetermined distance therefrom, and each stitch line further having a length not exceeding a half length of the folded portion on which the stitch line is formed, wherein a first-stage inflated portion of the air bag expands and projects forward from an opening formed in the cover and the constraint portions are located outside the opening.

3. A method of folding an air bag to be unfolded and inflated by gas introduced into the air bag comprising:

spreading flatly the air bag;

forming folded portions by folding a peripheral portion of the flatly spread air bag by turning the peripheral portion onto the flatly spread air bag thereby creating a folding line at a distal end portion of the folded air bag;

constraining the folded portions so that the folded portions are capable of being released by providing stitch lines joining the flat portion and each folded portion, each stitch line being parallel to a respective folding line and at a predetermined distance therefrom, and each stitch line further having a length not exceeding a half length of the folding line of the folded portion on which the stitch line is formed; and folding the air bag into an appropriate shape for containment in a space serving as an air bag housing.

4. An air bag system comprising:

an air bag to be unfolded and inflated by gas introduction into the air bag, the air bag having folded portions formed by folding a peripheral portion of a flatly spread flat portion toward a center portion of the flatly spread portion, and each folded portion stitched to the flat portion at a constraint portion located within the folded portion;

the folded portions being so arranged as to expand in specified directions when the constraint portions are released; and the constraint portions further including stitch lines joining the flat portion and each folded portion, each stitch line being parallel to a respective folding line and at a predetermined distance therefrom, and each stitch line further having a length not exceeding a half length of the folded portion on which the stitch line is formed, wherein a first-stage inflated portion of the air bag expands and projects forward from an opening formed in a cover and the constraint portions are located outside the opening.

5. An air bag system comprising:

an air bag to be unfolded and inflated by gas introduction into the air bag, the air bag having folded portions formed by folding a peripheral portion of a flatly spread flat portion toward a center portion of the flatly spread portion, and each folded portion stitched to the flat portion at a constraint portion located within the folded portion; and the constraint portions further including stitch lines joining the flat portion and each folded portion, each stitch line being parallel to a respective folding line and at a predetermined distance therefrom, and each stitch line further having a length not exceeding a half length of the folded portion on which the stitch line is formed, wherein a first-stage inflated portion of the air bag expands and projects forward from an opening formed in a cover and the constraint portions are located outside the opening.

6. An air bag system comprising:

an air bag to be unfolded and inflated by gas introduction into the air bag;

a cover for containing the air bag in a covered state;

a supporting member for supporting the air bag, the air bag having folded portions formed by folding a peripheral portion of a flatly spread flat portion of the air bag towards a side where the supporting member is located, and each folded portion being stitched to the flat portion at a constraint portion located within the folded portion for constraining the folded portions and for releasing the folded portions at a specified pressure;

a first-stage inflated portion located within an area defined by the constraint portions and being inflated by gas introduction into the air bag;

a second-stage inflated portion being inflated outside the constraint portions;

the folded portions being so arranged as to expand in specified directions when the constraint portions are released; and the constraint portions further including stitch lines joining the flat portion and each folded portion, each stitch line being parallel to a respective folding line and at a predetermined distance therefrom, and each stitch line further having a length not exceeding a half length of the folded portion on which the stitch line is formed, wherein a first-stage inflated portion of the air bag expands and projects forward from an opening formed in the cover and the constraint portions are located outside the opening.

\* \* \* \* \*

UNITED STATES PATENT AND TRADEMARK OFFICE
CERTIFICATE OF CORRECTION

PATENT NO : 5,899,495
DATED : May 4, 1999
INVENTOR(S) : Naoki Yamamoto, Kazuyoshi Nishijima, Kazuhiro Kaneko, and Mikio Ochiai It is certified that error appears in the above-identified patent and that said Letters Patent is hereby corrected as shown below:

On the title page after [22] Filed: /Apr. 25, 1997

Insert

[30] Foreign Application Priority Data

Apr. 26, 1996 [JP] Japan 108208/1996

Feb. 27, 1997 [JP] Japan 41167/1997

Signed and Sealed this

Fifth Day of October, 1999

Attest:

Q. TODD DICKINSON

Attesting Officer

Acting Commissioner of Patents and Trademarks